United States Patent
Tsukazaki

(10) Patent No.: US 9,092,648 B2
(45) Date of Patent: Jul. 28, 2015

(54) INFORMATION PROCESSING TERMINAL AND CONTENT WRITING SYSTEM

(75) Inventor: Fumiaki Tsukazaki, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 2019 days.

(21) Appl. No.: 11/758,397

(22) Filed: Jun. 5, 2007

(65) Prior Publication Data

US 2008/0005589 A1  Jan. 3, 2008

(30) Foreign Application Priority Data

Jun. 29, 2006 (JP) .................................. 2006-179565

(51) Int. Cl.
| G06F 12/14 | (2006.01) |
| G06F 21/78 | (2013.01) |
| G06F 21/50 | (2013.01) |
| G06F 21/62 | (2013.01) |

(52) U.S. Cl.
CPC ................ *G06F 21/78* (2013.01); *G06F 21/50* (2013.01); *G06F 21/62* (2013.01)

(58) Field of Classification Search
CPC ....... G06F 21/50; G06F 21/55; G06F 21/552; G06F 21/554; G06F 21/556; G06F 21/558; G06F 21/62; G06F 21/6272; G06F 21/78
USPC ........................ 713/189–190, 192; 726/26, 27
See application file for complete search history.

(56) References Cited

U.S. PATENT DOCUMENTS

| 7,886,970 B2 * | 2/2011 | Kurita ............................ 235/382 |
| 7,996,914 B2 * | 8/2011 | Hirota et al. .................... 726/29 |
| 2003/0145211 A1 | 7/2003 | Fukawa |
| 2003/0149854 A1 * | 8/2003 | Yoshino et al. ................ 711/173 |
| 2003/0188117 A1 * | 10/2003 | Yoshino et al. ................ 711/164 |
| 2005/0044404 A1 * | 2/2005 | Bhansali et al. .............. 713/200 |
| 2005/0055452 A1 | 3/2005 | Suzuki et al. |
| 2005/0182926 A1 * | 8/2005 | Akashika et al. ............. 713/159 |
| 2005/0286351 A1 * | 12/2005 | Hars ........................... 369/30.58 |
| 2006/0101136 A1 | 5/2006 | Akashika et al. |
| 2006/0107072 A1 * | 5/2006 | Umezu et al. .................. 713/193 |
| 2006/0129845 A1 * | 6/2006 | Nakashima et al. .......... 713/191 |
| 2007/0198855 A1 | 8/2007 | Kuroda et al. |

FOREIGN PATENT DOCUMENTS

| JP | 7-170280 | 7/1995 |
| JP | 2001-67268 | 3/2001 |
| JP | 2002-330128 | 11/2002 |

(Continued)

OTHER PUBLICATIONS

"Copyright Protection Technology", Japan Electronics and Information Technology Industries Association, May 17, 2006, pp. 1-13 (with partial English translation).

*Primary Examiner* — Joseph P Hirl
*Assistant Examiner* — Thomas Gyorfi
(74) *Attorney, Agent, or Firm* — Oblon, McClelland, Maier & Neustadt, L.L.P.

(57) ABSTRACT

An information processing terminal sends a download request for content data to a server. The server transmits command data to a command encryption device. The command encryption device encrypts the command data in an encryption circuit. The server sends the content data and the encrypted command data to the information processing terminal. A control part of the information processing terminal transmits the content data and the encrypted command data to a memory controller. The memory controller decodes the command data in a decoder circuit and stores the content data to a memory array.

13 Claims, 4 Drawing Sheets

(56) References Cited

FOREIGN PATENT DOCUMENTS

| JP | 2003-224559 | 8/2003 |
| JP | 2003-337924 | 11/2003 |
| JP | 2003-348069 | 12/2003 |
| JP | 2004-15527 | 1/2004 |
| JP | 2006-13695 | 1/2006 |
| JP | 2006-99509 | 4/2006 |
| WO | WO 2005/122164 A1 | 12/2005 |

* cited by examiner

INFORMATION PROCESSING TERMINAL AND CONTENT WRITING SYSTEM

BACKGROUND OF THE INVENTION

1. Field of the Invention

The present invention relates to a technique to avoid illegal writing of data into a memory.

2. Description of the Background Art

In various services used are systems to download contents from servers via internet. In a service for downloading music data, for example, a user stores downloaded music data into his music player and then can enjoy playing the music. In another service, a user downloads a game program and stores it into his memory, and then can enjoy playing the latest game.

Such download services using a network are very useful in getting desired contents easily in a short time. This requires, however, some measures against illegal copy of contents.

Users can use such download services by storing downloaded contents into various storage media. In other words, an operation of writing contents into the storage media is performed by users in such services. This causes the possibility that the operation of writing contents might be observed. If it becomes possible for vicious people to freely perform such an operation, this may lead to illegal copy of contents. If no measure is done against such an illegal action, the authors of contents may be unduly robbed of their rights and profits.

For the purpose of protection against illegal copy of contents, for example, used is a technology called "CPRM (Content Protection for Recordable Media)". "Copyright Protection Technology", May 17, 2006, Japan Electronics and Information Technology Industries Association (JEITA), [queried on Jun. 15, 2006], at page 10 (hereinafter referred to as "Copyright Protection Technology"), discloses a system for copyright protection function, i.e., "CPRM". A host equipment downloads a content with network encryption. Then, the host equipment creates an encryption key by using a device key of an equipment, a bunch of keys and a media ID of a memory card and the like and stores the content encrypted by using the encryption key into the memory card.

The technology disclosed in the above "Copyright Protection Technology", i.e., "CPRM" and the like intend to avoid illegal use of contents by encryption of content data. In other words, this is an approach to prevent illegal use of contents by encryption of data itself written into storage media. Considering that illegal copy might become trickier in the future, it is desirable to develop a technology to prevent illegal copy from a new point of view.

Further, in the technology of "Copyright Protection Technology", the contents with network encryption are once decoded by the host equipment. Therefore, since the decoded contents are temporarily stored in a RAM or the like inside the host equipment, there is a possibility that the state might be observed.

SUMMARY OF THE INVENTION

The present invention is intended for an information processing terminal for writing content data into a memory. According to the present invention, the information processing terminal comprises content input means for inputting content data from the outside of the terminal, command input means for inputting encrypted command data from the outside of the terminal, and control means for giving encrypted command data and content data to the memory, and in the information processing terminal, the memory comprises a memory array and a memory controller for decoding encrypted command data by using a decoder circuit and controlling an operation of writing content data into the memory array with the decoded command data.

By the present invention, it becomes difficult to observe a write command executed in the information processing terminal. With difficulty in observing the write command, it is possible to effectively prevent illegal copy of content data.

According to another aspect of the present invention, the command input means includes means for downloading encrypted command data from a server via a network.

It is thereby possible to perform a fast operation of writing content data while making it difficult to observe a write command.

According to still another aspect of the present invention, the server is connected to a command encryption device as an external equipment, which comprises an encryption circuit, and command data given from the server is encrypted in the command encryption device and the encrypted command data is downloaded into the information processing terminal.

By this aspect of the present invention, it also becomes difficult to observe encryption logic, and it is therefore possible to more effectively prevent illegal copy of content data.

It is therefore an object of the present invention to provide a technique to make it difficult to observe an operation of storing content data and effectively prevent illegal copy of the content data.

These and other objects, features, aspects and advantages of the present invention will become more apparent from the following detailed description of the present invention when taken in conjunction with the accompanying drawings.

DESCRIPTION OF THE PREFERRED EMBODIMENTS

1. The First Preferred Embodiment

Figure 1:
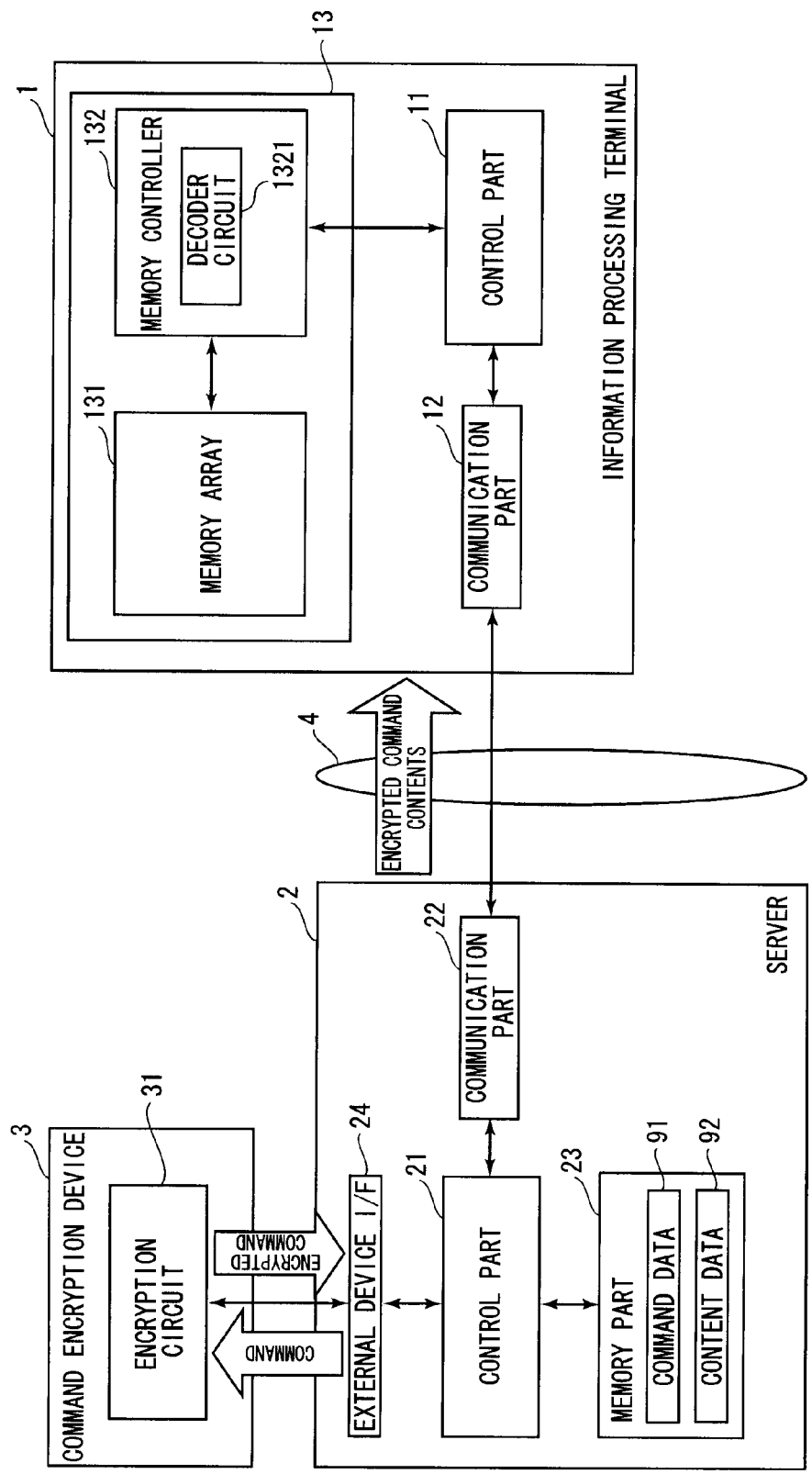
FIG. 1 is a view showing an overall structure of a memory writing system in accordance with a first preferred embodiment.

Hereinafter, with reference to drawings, the first preferred embodiment of the present invention will be discussed. FIG. 1 is a view showing an overall structure of a content writing system in accordance with the first preferred embodiment. This system includes an information processing terminal 1, a server 2 and a command encryption device 3. The information processing terminal 1 and the server 2 are connected to each other via a network 4 such as internet.

The information processing terminal 1 comprises a control part 11, a communication part 12 and a semiconductor memory 13. The control part 11 comprises a CPU, a RAM and the like and performs a general control over the information processing terminal 1. The communication part 12 performs communication with the server 2 via the network 4. The information processing terminal 1 reads data out from the semiconductor memory 13 and performs various data processings in the control part 11. Alternatively, the information processing terminal 1 writes data into the semiconductor memory 13.

Among the information processing terminals 1 are, for example, PDAs (Personal Digital Assistances), set-top boxes, game devices and the like. If a PDA or a set-top box is used as the information processing terminal 1, a memory in which application programs are recorded serves as the semiconductor memory 13. If a game device is used as the information processing terminal 1, a game cartridge in which a game program is stored serves as the semiconductor memory 13.

The semiconductor memory 13 comprises a memory array 131 which is a nonvolatile memory consisting of a lot of memory cells in which various pieces of information are stored and a memory controller 132 for controlling access to the memory array 131. The semiconductor memory 13 is detachable from the information processing terminal 1. The information processing terminal 1 gets access to various data by changing the semiconductor memories 13 to perform various processings. The semiconductor memory 13, however, may be incorporated in the information processing terminal 1.

The memory controller 132 comprises a decoder circuit 1321 for decoding encrypted command data given from the control part 11. The memory controller 132 is a circuit to decode the command by using the decoder circuit 1321 and then determines the description of the command to perform a processing in accordance with the description of the command.

When the command given from the control part 11 is a read command for data, the command includes a read instruction and a read address. The memory controller 132 gives the read instruction as a control signal to the memory array 131 and outputs the read address to the memory array 131 through a memory bus, to thereby read data out. When the command given from the control part 11 is a write command for data, the command includes a write instruction and a write address. The memory controller 132 gives the write instruction as a control signal to the memory array 131, outputs the write address to the memory array 131 through an address bus and outputs write data to the memory array 131 through a data bus, to thereby perform a write operation.

Theses read/write commands may be generated in the control part 11 and may be downloaded from the server 2. The characteristic feature of the present invention lies in a manner of dealing with the write command downloaded from the server 2. Therefore, hereinafter, a manner of dealing with the write command downloaded from the server 2 will be discussed.

The server 2 comprises a control part 21, a communication part 22, a memory part 23 and an external device interface 24. The control part 21 includes a CPU, a RAM and the like and performs a general control over the server 2. The communication part 22 performs communication with the information processing terminal 1. The memory part 23 is a storage medium such as a hard disk, a ROM or the like and stores command data 91 and content data 92 therein.

The command data 91 is, specifically, a write command used for writing the content data 92 into the semiconductor memory 13. Among the content data 92 are, for example, an application program, copyright protection data, a game program and the like.

The external device interface 24 is an interface for connection with the command encryption device 3. The external device interface 24 is, for example, a USB interface, and the command encryption device 3 comprises a USB interface. The external device interface 24 and the command encryption device 3 are connected to each other with a USB cable. Alternatively, there is a possible case where the external device interface 24 is a PCI slot and the command encryption device 3 is a device insertable into the PCI slot. In any case, the command encryption device 3 is directly connected to the server 2 through a signal cable or the like, not via a network. The interface standards are not particularly limited.

The command encryption device 3 comprises an encryption circuit 31. The command encryption device 3 encrypts the command data 91 given from the server 2 by using the encryption circuit 31. The command encryption device 3 transmits the encrypted command data 91 to the control part 21.

Now, discussion will be made on a flow of operation for downloading and writing the content data 92, which is executed by a system having the above construction.

First, a user operates the information processing terminal 1 to give an instruction for downloading the content data 92. This instruction is given through an operation button or the like which is not shown and included in the information processing terminal 1. When the instruction for downloading is given, the control part 11 sends a download request for the content data 92 to the server 2.

Receiving the download request, the control part 21 of the server 2 acquires the command data 91 from the memory part 23 and transmits it to the command encryption device 3. The command encryption device 3 encrypts the acquired command data 91 by using the encryption circuit 31. The encrypted command data 91 is transmitted to the control part 21.

Next, the control part 21 sends the content data 92 and the encrypted command data 91 to the information processing terminal 1. The information processing terminal 1 thereby downloads the content data 92 and the encrypted command data 91.

Subsequently, in the information processing terminal 1, the control part 11 transmits the content data 92 and the encrypted command data 91 to the memory controller 132. In the memory controller 132, the decoder circuit 1321 decodes the encrypted command data. In other words, the decoder circuit 1321 has a configuration to achieve an algorithm capable of decoding encrypted data in the command encryption device 3.

After the command data 91 is decoded in the decoder circuit 1321, the memory controller 132 performs an operation in accordance with the command data 91. As discussed above, the command data 91 is a write command for the content data 92. The memory controller 132 acquires the write instruction and the write address included in the command data 91 and gives the write instruction as a control signal to the memory array 131. The memory controller 132 also gives the write address to the memory array 131 through the address bus. Further, the memory controller 132 gives the content data 92 to the memory array 131 through the data bus. Thus, a write operation of the content data 92 into the memory array 131 is performed.

Since the memory writing system of the present invention has the above construction, it can prevent illegal copy of the content data 92. In other words, in order to write the content data 92 into the semiconductor memory 13, the command data 91 serving as a write command is needed. The command data 91 downloaded into the information processing terminal 1 which a user uses has been already encrypted. Therefore, it is difficult for the user to observe the write command. Further, the encrypted command is given to the memory controller 132, not being decoded in the control part 11 of the information processing terminal 1. The memory controller 132 decodes the encrypted command data 91 by hardware, and the decoded command data 91 is used as a signal for controlling a circuit to output an instruction and address information to the memory array 131 but is not stored in a RAM as cleartext (plaintext). Therefore, it becomes very difficult for a user to observe the write command.

Further, the command data 91 is not encrypted by software operation in the server 2 but is encrypted by the command encryption device 3 which is an externally-connected hardware device. Therefore, it is difficult to observe an encryption logic and it is thereby possible to effectively prevent illegal copy.

In the first preferred embodiment, since the command data 91 is stored in the memory part 23 of the server 2 as cleartext, there is a requirement that the server 2 should be managed by a reliable person to achieve high security strength.

2. The Second Preferred Embodiment

Figure 2:
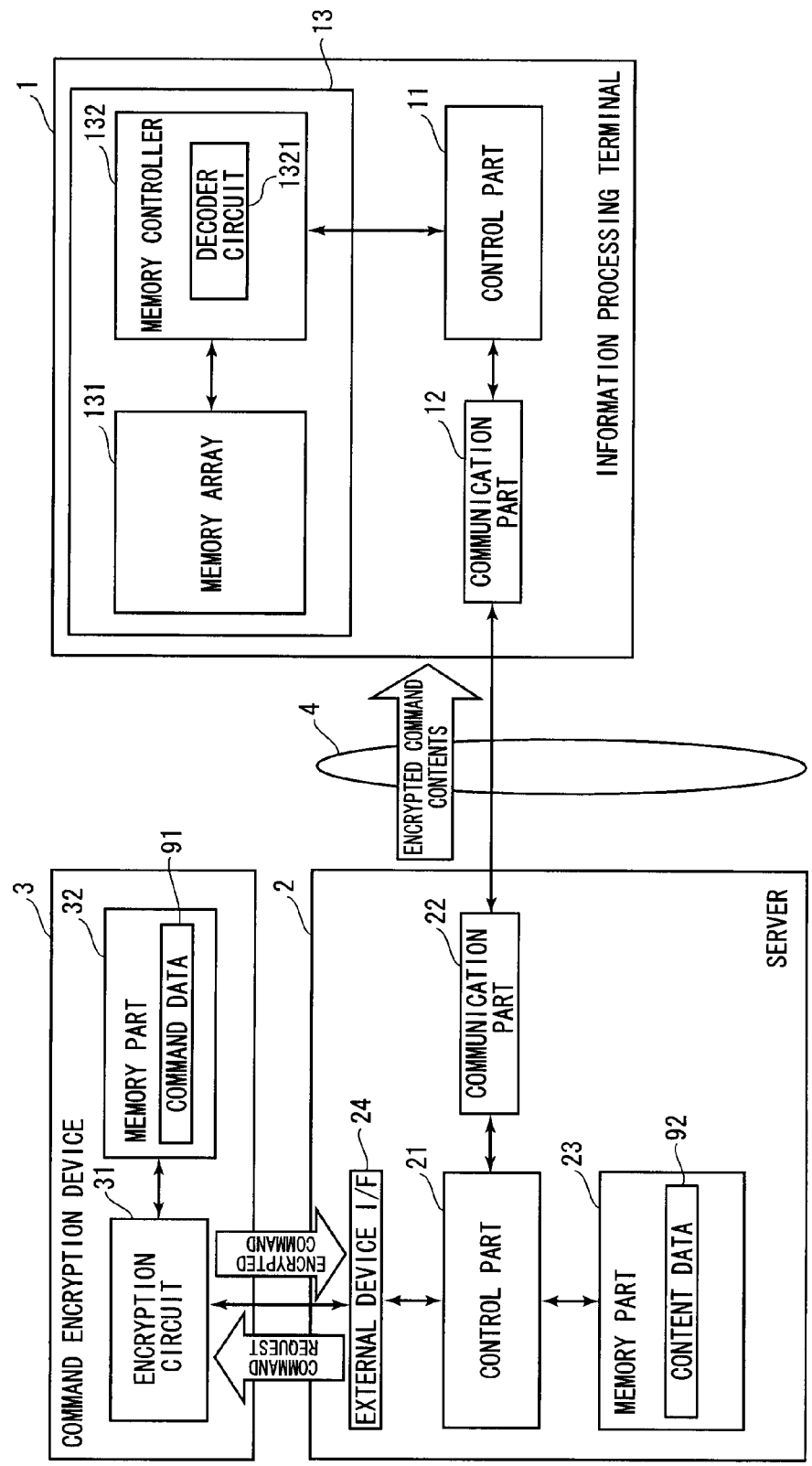
FIG. 2 is a view showing an overall structure of a memory writing system in accordance with a second preferred embodiment.

Next, the second preferred embodiment of the present invention will be discussed. FIG. 2 is a view showing an overall structure of a memory writing system in accordance with the second preferred embodiment. The second preferred embodiment is different from the first preferred embodiment in that the command data 91 is not stored in the memory part 23 of the server 2. In the second preferred embodiment, the command data 91 is stored in a memory part 32 of the command encryption device 3.

Like in the first preferred embodiment, the server 2 receives a download request for the content data 92 from the information processing terminal 1. Receiving the download request, the control part 21 gives a command request signal and an encryption parameter to the command encryption device 3. In other words, the control part 21 outputs a signal to request transmission of the encrypted command data 91 to the command encryption device 3.

Receiving the command request signal and the encryption parameter, the command encryption device 3 acquires the command data 91 from the memory part 32 and encrypts the command data 91 in the encryption circuit 31. At that time, the command encryption device 3 performs encryption by using the encryption parameter received from the server 2 as key information. Then, the command encryption device 3 transmits the encrypted command data 91 to the control part 21.

The following operation is the same as that in the first preferred embodiment. The server 2 sends the content data 92 and the encrypted command data 91 to the information processing terminal 1. In the information processing terminal 1, the memory controller 132 decodes the command data 91, to thereby perform a write operation of the content data 92 into the memory array 131.

By using the memory writing system of the second preferred embodiment, like in the first preferred embodiment, it becomes difficult for a user to observe the write command. It is therefore possible to avoid an illegal write operation of the content data 92 by a vicious person.

As discussed above, in the second preferred embodiment, the command data 91 is not stored in the memory part 23 of the server 2. The command data 91 is stored in the memory part 32 of the command encryption device 3, and the memory part 32 has no interface which allows external access. The memory part 32 is accessible only by the encryption circuit 31, and this eliminates the possibility that the command data 91 might be outputted to the outside of the command encryption device 3 while not being encrypted. Therefore, the command data 91 that is cleartext is concealed by hardware and the security strength is thereby increased. In the second preferred embodiment, since the command data 91 is not stored in the server 2, a server managed by a commissioned firm can be used as the server 2.

3. The Third Preferred Embodiment

Figure 3:
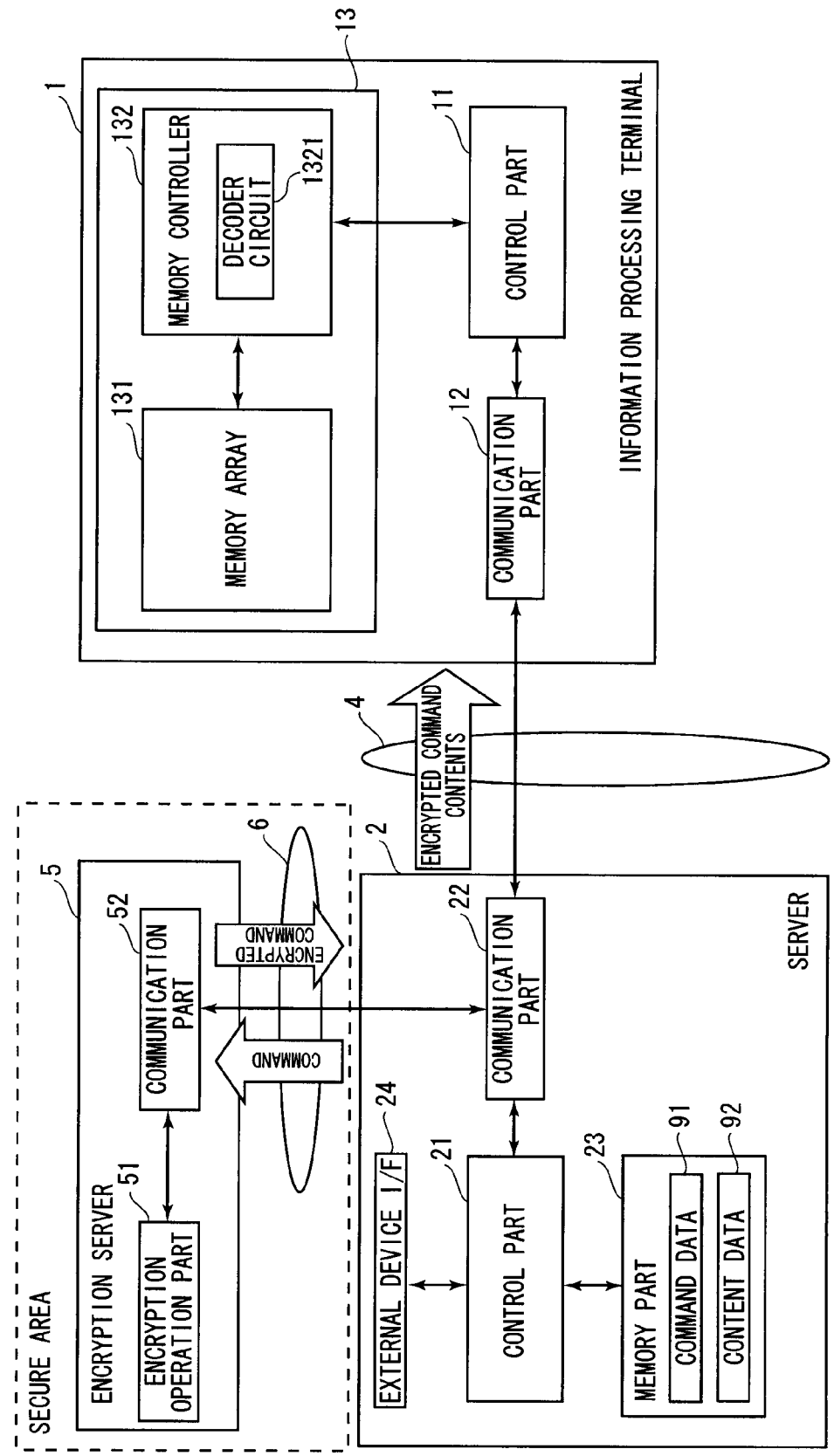
FIG. 3 is a view showing an overall structure of a memory writing system in accordance with a third preferred embodiment.

Next, the third preferred embodiment of the present invention will be discussed. FIG. 3 is a view showing an overall structure of a memory writing system in accordance with the third preferred embodiment. The third preferred embodiment is different from the first preferred embodiment in that the command encryption device 3 is not connected to the server 2. In the third preferred embodiment, an encryption server 5 is connected to the server 2 via a network 6.

Herein, the network 6 and the encryption server 5 each have a construction to ensure high security strength. Specifically, the network 6 is a closed network such as a LAN, and a thorough management is achieved on entry into/exit from a room where the network 6 and the encryption server 5 are provided.

The encryption server 5 comprises an encryption operation part 51 and a communication part 52. The encryption operation part 51 is a function part implemented by executing an encryption operation program stored in the encryption server 5 with hardware resources such as a CPU. In other words, the encryption operation part 51 is an operation part to encrypt the command data 91 by software operation. The communication part 52 performs communication with the server 2.

Like in the first preferred embodiment, the server 2 receives a download request for the content data 92 from the information processing terminal 1. Receiving the download request, the control part 21 sends the command data 91 to the encryption server 5 via the network 6.

Receiving the command data 91, the encryption server 5 encrypts the command data 91 in the encryption operation part 51. Then, the encryption server 5 sends the encrypted command data 91 to the server 2.

The following operation is the same as that in the first preferred embodiment. The server 2 sends the content data 92 and the encrypted command data 91 to the information processing terminal 1. In the information processing terminal 1, the memory controller 132 decodes the command data 91, to thereby perform a write operation of the content data 92 into the memory array 131.

By using the memory writing system of the third preferred embodiment, like in the first preferred embodiment, it becomes difficult for a user to observe the write command. It is therefore possible to avoid an illegal write operation of the content data 92 by a vicious person.

The third preferred embodiment may adopt the idea of the second preferred embodiment. Specifically, the command data 91 is not stored in the server 2 but stored in the encryption server 5 provided in a reliable and secure area. Receiving the download request for the contents from the information processing terminal 1, the server 2 sends the command request signal and the encryption parameter to the encryption server 5, like in the second preferred embodiment. The encryption server 5 encrypts the command data 91 stored therein by using the received encryption parameter as key information. Such a construction allows the command data 91 that is cleartext to be present only in the reliable encryption server 5 and thereby achieve high security strength. Further, since the command data 91 is not stored in the server 2, a server managed by a commissioned firm can be used as the server 2.

4. The Fourth Preferred Embodiment

Figure 4:
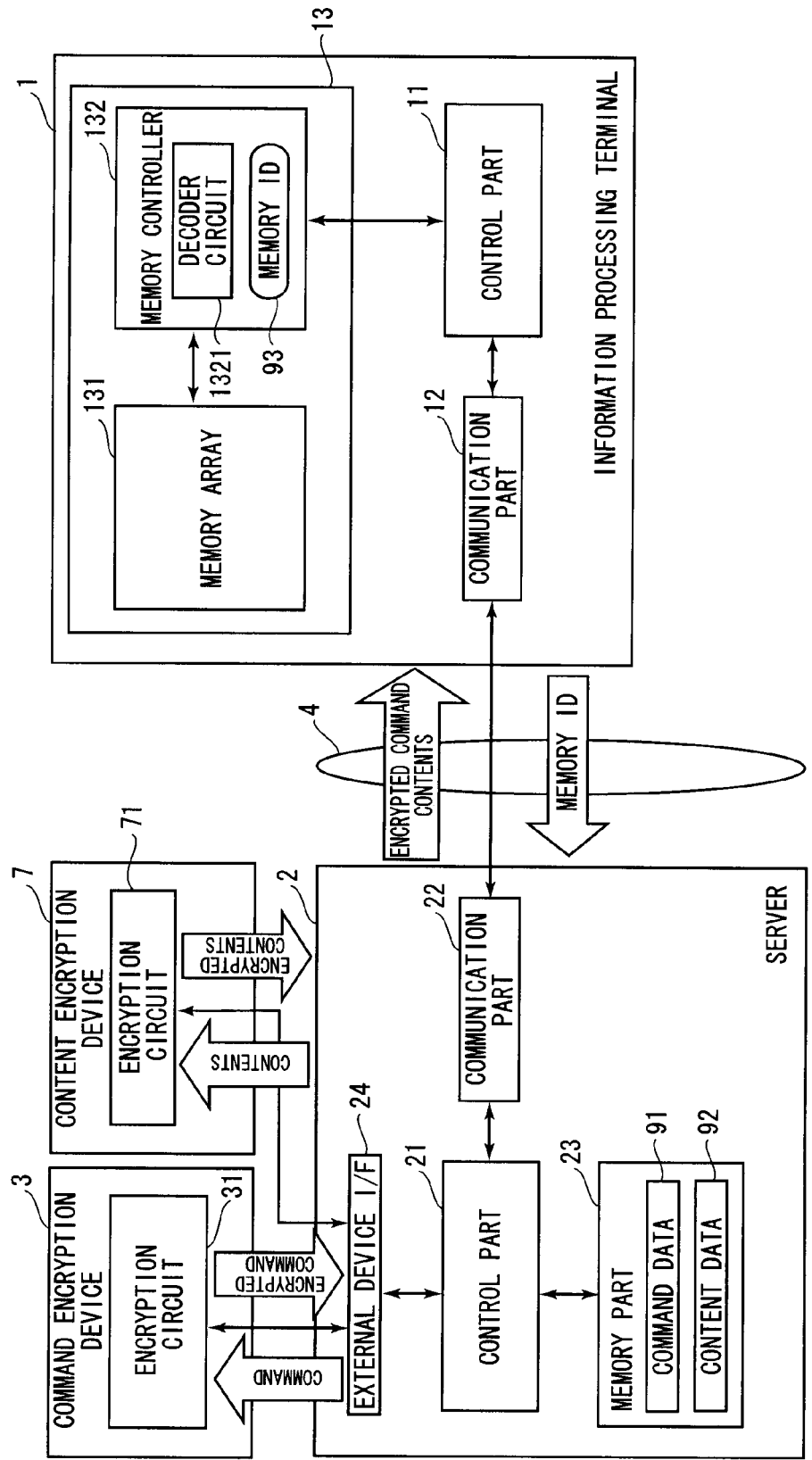
FIG. 4 is a view showing an overall structure of a memory writing system in accordance with a fourth preferred embodiment.

Next, the fourth preferred embodiment of the present invention will be discussed. FIG. 4 is a view showing an overall structure of a memory writing system in accordance with the fourth preferred embodiment. The fourth preferred embodiment is different from the first preferred embodiment in that the external device interface 24 of the server 2 is further connected to a content encryption device 7. The content encryption device 7 comprises an encryption circuit 71. The content encryption device 7 is also an external equipment connected to the server 2 with an interface such as a USB or a PCI, and encrypts the content data 92 by hardware operation.

The fourth preferred embodiment is further different from the first preferred embodiment in that when the information processing terminal 1 sends the download request for the content data 92, this request data includes a memory ID 93 of the semiconductor memory 13. The memory ID 93 is used as the key information for encryption of the content data 92. The memory ID 93 is stored in a ROM or the like inside the memory controller 132. The memory ID 93 is information inherent in the semiconductor memory 13.

First, when a user performs an operation to download the content data 92, the control part 11 sends the download request for the content data 92 to the server 2. At that time, the control part 11 acquires the memory ID 93 from the memory controller 132 and sends the download request including the memory controller 132.

Receiving the download request, in the server 2, the control part 21 acquires the command data 91 and the content data 92 from the memory part 23. Then, the control part 21 transmits the command data 91 to the command encryption device 3 and transmits the content data 92 to the content encryption device 7. The control part 21 further transmits the memory ID 93 received from the information processing terminal 1 to the content encryption device 7.

The command encryption device 3 encrypts the command data 91 by using the encryption circuit 31 and transmits the encrypted command data 91 to the control part 21. The content encryption device 7 encrypts the content data 92 by using the encryption circuit 71. At that time, the memory ID 93 is used as the key information for encryption. Alternatively, the memory ID 93 may be used as part of the key information. The encrypted content data 92 is transmitted to the control part 21.

Next, the control part 21 sends the encrypted command data 91 and the encrypted content data 92 to the information processing terminal 1. Thus, the information processing terminal 1 acquires the encrypted command and the encrypted contents.

Subsequently, the control part 11 outputs the encrypted command data 91 and the encrypted content data 92 to the memory controller 132. The memory controller 132 decodes the command data 91 and the content data 92 by using the decoder circuit 1321. For decoding the content data 92, the memory ID 93 is used as the key information. Then, the memory controller 132 stores the decoded content data 92 into the memory array 131 by using the decoded command.

By using the memory writing system of the fourth preferred embodiment, like in the first preferred embodiment, it becomes difficult for a user to observe the write command. It is therefore possible to avoid an illegal write operation of the content data 92 by a vicious person.

In the fourth preferred embodiment, the content data 92 is encrypted by using the information inherent in the semiconductor memory 13. Therefore, providing security for the contents makes it possible to effectively prevent illegal use of the content data 92 while it is difficult to observe the write command. Further, since the content data 92 is encrypted by using the memory ID 93 which is information inherent in the semiconductor memory 13 as the key information, even if a third party obtains the content data 92, it is impossible for the third party to decode the content data 92, and therefore an operation with high security strength can be achieved.

Though the command data 91 is stored in the memory part 23 of the server 2 in the fourth preferred embodiment, the command data 91 may be stored in the memory part inside the command encryption device 3, like in the second preferred embodiment. In this case, the control part 21 has only to give the command request signal to the command encryption device 3. Such a construction allows the command that is cleartext to be present only in the command encryption device, like in the second preferred embodiment, and thereby achieve higher security strength. Further, the content data 92 may be stored in a memory part inside the content encryption device 7.

Furthermore, combination of the constructions of the fourth and third preferred embodiments may be adopted. Specifically, the command data 91 is encrypted in the encryption server 5 connected via the network 6 like in the third preferred embodiment and the content data 92 is encrypted in the content encryption device 7 like in the fourth preferred embodiment. In other words, the command data 91 is encrypted by software operation in the encryption server 5 and the content data 92 is encrypted by hardware operation. As discussed in the third preferred embodiment, however, there is a requirement that the encryption server 5 and the network 6 should be highly secure. The command data 91 that is cleartext may be stored in the server 2 or in the encryption server 5. Alternatively, there may be a converse case where the command data 91 is encrypted by an external hardware device and the content data 92 is encrypted by software operation in a server connected via a network. Further, there may be another case where the command data 91 is encrypted in a server connected via a network and the content data 92 is also encrypted in the server connected via the network. In other words, both the command and the contents may be encrypted by software operation.

VARIATIONS

Though the preferred embodiments of the present invention have been discussed above, the method by which the information processing terminal 1 acquires the command data 91 and the content data 92 is not limited to downloading via a network. For example, the encrypted command data 91 which is stored in a memory key may be provided. A user can acquire the encrypted command by inserting the memory key into the information processing terminal 1. Similarly, the content data 92 which is stored in a storage medium such as a memory card may be provided.

In the above-discussed preferred embodiments, the information processing terminal 1 acquires both the encrypted command data 91 and the content data 92 from the outside. There may be another construction where the encrypted command data is acquired from the outside by downloading or via various media and the content data is generated inside the information processing terminal 1.

Further, though the case where the command data 91 and the content data 92 are downloaded from the same server 2 has been discussed in the above preferred embodiments, these data may be surely downloaded from different servers.

While the invention has been shown and described in detail, the foregoing description is in all aspects illustrative and not restrictive. It is therefore understood that numerous modifications and variations can be devised without departing from the scope of the invention.

What is claimed is:

1. An information processing terminal for writing content data into a memory, comprising:
control means for transmitting, to a server connected therewith via a network, a request to acquire content data containing identification information for the memory, and controlling writing of content data into the memory;
content input means for inputting encrypted content data from said server; and
command input means for inputting encrypted command data from said server,
the control means being capable of acquiring, as a response by the server to the request to acquire, the encrypted content data input by the content input means and the encrypted command data input by the command input means and providing the acquired encrypted content data and encrypted command data to said memory,
said memory including only
a memory array, and
a memory controller configured
to decode the encrypted content data and encrypted command data via a decoder circuit, and
to control writing of the decoded content data into said memory array using the decoded command data,
the encrypted command data being generated by encrypting command data based on an encryption parameter, and
the encrypted content data being generated by encrypting content data based on an encryption key that uses the identification information.

2. The information processing terminal according to claim 1, wherein
said server is connected to an external command encryption device that includes an encryption circuit,
command data from said server is encrypted in said external command encryption device, and
the encrypted command data is downloaded into said information processing terminal.

3. The information processing terminal according to claim 1, wherein
said server is connected to a command encryption device as an external equipment, which includes an encryption circuit,
command data stored in said command encryption device is encrypted in said command encryption device, and
the encrypted command data is downloaded into said information processing terminal.

4. The information processing terminal according to claim 1, wherein
said server is connected via the network to an encryption server that performs encryption,
command data from said server is encrypted in said encryption server, and
the encrypted command data is downloaded into said information processing terminal.

5. The information processing terminal according to claim 1, wherein
said server is connected via a network to an encryption server that performs encryption,
command data stored in said encryption server is encrypted in said encryption server and
the encrypted command data is downloaded into said information processing terminal.

6. The information processing terminal of claim 1, wherein the memory controller writes the content data directly into the memory array.

7. A system for writing content data into a memory, comprising:
an information processing terminal; and
a server,
wherein said information processing terminal includes
control means for transmitting, to a server connected therewith via a network, a request to acquire content data containing identification information for the memory, and controlling writing of content data into the memory;
content input means for inputting encrypted content data from said server,
first downloading means for downloading encrypted command data from said server,
the control means being capable of acquiring, as a response by the server to the request to acquire, the encrypted content data input by the content input means and the encrypted command data downloaded by the first downloading means and providing the acquired encrypted content data and encrypted command data to said memory, said memory including only
a memory array, and
a memory controller configured
to decode the encrypted content data and encrypted command data via
a decoder circuit, and
to control writing of the decoded content data into said memory array
using the decoded command data,
the encrypted command data being generated by encrypting command data based on an encryption parameter, and
the encrypted content data being generated by encrypting content data based on an encryption key that uses the identification information.

8. The content writing system according to claim 7, wherein
said server is connected to an external command encryption device that includes an encryption circuit,
command data from said server is encrypted in said external command encryption device, and
the encrypted command data is downloaded into said information processing terminal.

9. The content writing system according to claim 7, wherein
said server is connected to a command encryption device as an external equipment, which includes an encryption circuit,
command data stored in said command encryption device is encrypted in said command encryption device and
the encrypted command data is downloaded into said information processing terminal.

10. The content writing system according to claim 7, wherein
said server is connected via the network to an encryption server that performs encryption,
command data from said server is encrypted in said encryption server, and
the encrypted command data is downloaded into said information processing terminal.

11. The content writing system according to claim 7, wherein
said server is connected via a network to an encryption server that performs encryption,
command data stored in said encryption server is encrypted in said encryption server and the encrypted command data is downloaded into said information processing terminal.

12. A method of an information processing terminal for writing content data into a memory, the method comprising:
- transmitting, at a control unit, to a server connected therewith via a network, a request to acquire content data containing identification information for the memory, and controlling writing of content data into the memory;
- inputting, at a content input unit, encrypted content data from said server; and
- inputting, at a command input unit, encrypted command data from said server,
- wherein the control unit is capable of acquiring, as a response by the server to the request to acquire, the encrypted content data input by the content input unit and the encrypted command data input by the command input unit and providing the acquired encrypted content data and encrypted command data to said memory,
- the memory including only a memory array and a memory controller;
- decoding, at the memory controller, the encrypted content data and encrypted command data via a decoder circuit; and
- controlling, at the memory controller, writing of the decoded content data into said memory array using the decoded command data,
- the encrypted command data being generated by encrypting command data based on an encryption parameter, and
- the encrypted content data being generated by encrypting content data based on an encryption key that uses the identification information.

13. An information processing terminal for writing content data into a memory, comprising:
- a control unit configured to transmit, to a server connected therewith via a network, a request to acquire content data containing identification information for the memory, and to control writing of content data into the memory;
- a content input unit configured to input encrypted content data from said server; and
- a command input unit configured to input encrypted command data from said server
- wherein the control unit is capable of acquiring, as a response by the server to the request to acquire, the encrypted content data input by the content input unit and the encrypted command data input by the command input unit and providing the acquired encrypted content data and encrypted command data to said memory, said memory including only
- a memory array, and
- a memory controller configured
  - to decode the encrypted content data and encrypted command data via a decoder circuit, and
  - to control the writing of the decoded content data into said memory array using the decoded command data,
- the encrypted command data being generated by encrypting command data based on an encryption parameter, and
- the encrypted content data being generated by encrypting content data based on an encryption key that uses the identification information.

* * * * *